3,097,142
BENZYL ALCOHOL STABILIZED POLIO VACCINES AND PRODUCTION THEREOF

Lee F. Schuchardt, North Wales, and Samuel Morton Zulick, Narberth, Pa., assignors to Merck & Co. Inc., Rahway, N.J., a corporation of New Jersey
No Drawing. Filed Mar. 30, 1960, Ser. No. 18,500
10 Claims. (Cl. 167—78)

This invention relates to vaccine products and to methods for preparing the same. More particularly, the invention relates to poliomyelitis vaccine products as well as poliomyelitis vaccines containing diphtheria, tetanus and pertussis antigens and to methods for preparing them.

For the prevent of paralytic poliomyelitis, it is now customary to inject poliomyelitis (aqueous) vaccine composed of killed but antigenic poliomyelitis viruses of Types I, II and III. It is essential that the vaccine be sterile, that is, free from contaminating bacteria, molds and fungi not only at the time of manufacture and packaging but also at the time of administration. In an attempt to insure that the poliomyelitis virus vaccine will be free from contaminating bacteria, molds and fungi and to safely remain so it has been proposed to add a preservative, such as thimerosal or benzethonium chloride, the latter being described in the U.S. patent to McLean No. 2,793,160, granted May 21, 1957. Thimerosal, unfortunately, is not compatible with poliomyelitis vaccine since it causes the polimyelitis vaccine to lose its potency.

It is, accordingly, an object of this invention to provide a vaccine product which is safely free from contamination at the time of administration and also retains its antigenicity over a considerable period of time under normal conditions of storage.

Although benzethonium chloride has much less tendency than merthiolate to reduce the potency of polio vaccine, it is another object of this invention to provide a preservative having all of the advantages of benzethonium chloride and in some cases having even less of an adverse effect upon the antigenicity of poliomyelitis vaccine.

Surprisingly these objects as well as other objects which will appear hereinafter can be realized and the aforementioned difficulties with poliomyelitis vaccine products overcome in accordance with the invention, by incorporating benzyl alcohol into a "killed" poliomyelitis or other vaccine, i.e., an aqueous solution containing non-infectious but antigenic poliomyelitis virus, or into a vaccine containing polimyelitis antigen and any one of diphtheria, tetanus or pertussis antigens. More particularly, the present invention comprises incorporating benzyl alcohol into an aqueous killed poliomyelitis vaccine in a concentration, percent by volume, in the range from about 0.5% to 2.0%, preferably 0.5 to 0.9%. The benzyl alcohol is preferably incorporated into the vaccine by slowly adding the benzyl alcohol to the aqueous killed poliomyelitis or other vaccine, with efficient stirring. The preferred products are those which contain about 0.5% to 0.9% by volume of benzyl alcohol.

The aqueous, killed poliomyelitis vaccines used in the production of products of the invention can contain any or all of the various types of poliomyelitis virus. The preferred vaccines are those which contain Types I, II and III of poliomyelitis virus. Particularly suitable vaccines are those which are relatively low in protein content, preferably those which contain less than about 18 to 20 gamma (micrograms) per ml. of protein nitrogen.

Such vaccines can be produced in a number of different ways. For example, macerated monkey tissue can be trypsinized to remove extraneous tissue, the residual cells allowed to multiply, the medium inoculated with the poliomyelitis virus, the mixture incubated, the fluid harvested and the living virus inactivated by treatment with formaldehyde, ultraviolet radiation or other suitable means. If desired vaccines prepared by omission of the trypsinization step can also be used but in this instance the protein content of the vaccine may be excessively high and should be assayed before use. In the preparation of mixed vaccines, that is, vaccines containing more than one type of poliomyelitis virus, it is customary to pool or mix the harvested fluids containing the various types subsequent to the inactivation step although, if desired, this can be done preliminarily.

This invention is applicable not only to poliomyelitis vaccines containing any one of Type I, II or III virus, but is applicable as well to combinations of any one or more of such viruses with other ingredients such, for example, as diphtheria toxoid, tetanus toxoid, or heat detoxified pertussis organisms or fractions thereof for example. The practice of using combined diphtheria, pertussis and tetanus antigens is well established, and the efficiency of such combination in pediatric practice has been discussed by Ipsen and Bowen in A.J.P.H., 45, 3:312–318 (March 1955). Heretofore, the combined diphtheria, pertussis and tetanus antigens have been conventionally preserved by thimerosal which is sodium-ethyl-mercuri-thiosalicylate in quantities of about 1:10,000. One method of making the combined diphtheria, pertussis and tetanus antigens is disclosed in the patent to Pillemer No. 2,528,972. Moreover, a method of preparing a combined poliomyelitis-diphtheria-tetanus-pertussis antigen product is disclosed in co-pending patent application Serial No. 770,905, filed October 31, 1958. This application refers to the incorporation of benzethonium chloride into the four-way vaccine as a preservative therefor.

Specific examples of vaccines, utilizing the preservative in accordance with this invention, appear in the following tables. In each table, the quantity of poliomyelitis vaccine is expressed in milliliters of Salk vaccine; each milliliter contains from .035–0.35 microgram of Type I poliovirus, .01–0.1 microgram of Type II poliovirus and .01–0.1 microgram of Type III poliovirus.

This invention is illustrated by the following examples:

EXAMPLES 1–5
[0.5 ml. dosage; total human dose 1.5 ml.]

| | | | | | |
|---|---|---|---|---|---|
| Poliomyelitis killed virus Types I, II and III (ml. Salk vaccine/ml. total) | 0.4 | 0.45 | 0.4 | 0.44 | 0.42 |
| Diphtheria toxoid (Lf/ml.) | 85 | 50 | 75 | 100 | 25 |
| Pertussis cells (opacity units/ml.) | 16 | 24 | 28 | 32 | 20 |
| Tetanus antigen (Lf/ml.) | 25 | 20 | 30 | 10 | 40 |
| Benzyl alcohol ($C_6H_5CH_2OH$) (percent by volume) | 0.6 | 0.5 | 0.9 | 2.0 | 0.7 |

EXAMPLES 6–10
[1 ml. dosage; total human dose 3 ml.]

| | | | | | |
|---|---|---|---|---|---|
| Poliomyelitis killed virus, Types I, II and III | .5 | .90 | .6 | .95 | .4 |
| Diphtheria toxoid | 12.5 | 25 | 20 | 42.5 | 50 |
| Pertussis cells | 16 | 12 | 8 | 8 | 10 |
| Tetanus antigen | 10 | 10 | 18 | 20 | 14 |
| Benzyl alcohol ($C_6H_5CH_2OH$) (percent by volume) | 0.9 | 0.5 | 2.0 | 0.8 | 1.5 |

EXAMPLES 11–20

*Poliomyelitis Vaccine*

| Poliomyelitis killed virus, Types I, II and III (ml.) | Benzyl alcohol (parts by volume) |
|---|---|
| 100 | 0.5 |
| 100 | 0.8 |
| 100 | 2.0 |
| 100 | 1.7 |
| 100 | 0.6 |
| 100 | 1.1 |
| 100 | 1.5 |
| 100 | 0.7 |
| 100 | 1.4 |
| 100 | 1.9 |

EXAMPLES 21–26

| | | | | | | |
|---|---|---|---|---|---|---|
| Poliomyelitis killed virus, Types I, II and III (ml. Salk vaccine/ml. total) | 0.4 | 0.4 | 0.6 | 0.95 | 0.75 | 0.85 |
| Tetanus toxoid ($L_f$/ml.) | 40 | 10 | 5 | 10 | 15 | 20 |
| Benzyl alcohol (parts by volume) | 0.5 | 1.5 | 0.7 | 1.1 | 2.0 | 0.5 |

EXAMPLES 27–33

| | | | | | | | |
|---|---|---|---|---|---|---|---|
| Poliomyelitis killed virus, Types I, II and III (ml. Salk vaccine/ml. total) | 0.4 | 0.45 | 0.4 | 0.95 | 0.6 | 0.90 | 0.80 |
| Diphtheria toxoid ($L_f$/ml.) | 4.0 | 4.0 | 4.0 | 2.0 | 2.0 | 2.0 | 2.0 |
| Tetanus toxoid ($L_f$/ml.) | 20 | 10 | 40 | 10 | 5 | 15 | 20 |
| Benzyl alcohol (parts by volume) | 0.5 | 0.75 | 2.0 | 0.5 | 1.2 | 0.95 | 0.5 |

EXAMPLE 34

Samples of poliomyelitis vaccine were preserved with 0.5% by volume of benzyl alcohol and the vaccine samples were tested for stability following aging at 37° C. for 7 days. This was carried into effect by holding samples of the vaccine at 37° C. for 7 days and testing in chicks for polio antigenicity. The chicks were injected intramuscularly with 0.5 ml. of neat (undiluted) vaccine and this was repeated 14 days later. All chicks were bled on the 21st day, and the test was repeated on four successive occasions. All sera were tested by the metabolic inhibition method at a 1:8 dilution against approximately 100 $ID_{50}$'s of the three type of poliomyelitis virus. The results are summarized in Table I which follows:

TABLE I

| Preservative | Part A | | | Part B | | | Part C | | | Part D | | | Total conversions |
|---|---|---|---|---|---|---|---|---|---|---|---|---|---|
| | Poliomyelitis Type I | Poliomyelitis Type II | Poliomyelitis Type III | Poliomyelitis Type I | Poliomyelitis Type II | Poliomyelitis Type III | Poliomyelitis Type I | Poliomyelitis Type II | Poliomyelitis Type III | Poliomyelitis Type I | Poliomyelitis Type II | Poliomyelitis Type III | |
| Butyl alcohol | [1] 9/15 | 12/15 | 15/15 | 8/15 | 15/15 | 14/15 | 7/14 | 13/14 | 14/14 | 14/15 | 15/15 | 15/15 | 151/177=85%. |
| None, 37° C | 8/15 | 14/15 | 13/15 | 6/14 | 12/14 | 14/15 | 11/14 | 14/14 | 14/14 | 13/15 | 15/15 | 14/15 | 148/174=85%. |
| None, 2–5° C | 14/15 | 14/15 | 14/15 | 10/15 | 14/15 | 15/15 | 14/15 | 14/15 | 14/15 | 15/15 | 15/15 | 15/15 | 168/180=93%. |
| Virus $ID_{50}$ | 398 | 446 | 501 | 355 | 177 | 316 | 100 | 100 | 89 | 89 | 100 | 56 | |

[1] Conversions/totals.

EXAMPLE 35

Samples of poliomyelitis vaccine were preserved with 0.5% benzyl alcohol by volume and the vaccine samples were tested for stability following aging at 2–5° C. for 6 months. This was carried into effect in two ways, one of which comprised a monkey potency test wherein samples of the vaccines, preserved with the benzyl alcohol, were held at 2–5° C. for 6 months and then tested for polio potency in monkeys. The results obtained appear in the following table, showing the potencies of each of the three types of poliomyelitis virus, as compared to the potency of the original.

*Monkey Potency Results of Vaccines Aged 6 Months—Ratio of Test Monkey Serum Titers to NIH Reference Antisera II A3.*

| Preservative | Poliovirus type | | |
|---|---|---|---|
| | I | II | III |
| Benzyl alcohol | 1.51 | 2.71 | 4.41 |
| Original | 2.00 | 3.83 | 9.45 |

EXAMPLE 36

Poliomyelitis vaccine preserved at 2–5° C. for 6 months with benzyl alcohol (0.5% by volume) was also tested for chick potency. Samples of the vaccine were held at 2–5° C. for 6 months and then tested for polio potency in chicks. Groups of eight chicks were injected intramuscularity with 1 ml. of vaccine diluted 1.3, 1:30 or 1:300 on a given date and 14 days thereafter. On the 21st day all of the chicks were bled. The test was repeated on four successive weeks. All sera were tested for virus neutralization by the metabolic inhibition method at a 1:8 dilution against approximately 100 $ID_{50}$'s of the three types of poliomyelitis virus. Both the initial and the 6-month assays were run, using NIH 2A Reference Vaccine. The results are summarized as follows:

*Chick Potency Results of Vaccines Aged 6 Months—Ratio of Test Vaccine to NIH 2A Reference Vaccine*

| Preservative | Poliovirus type | | | | | |
|---|---|---|---|---|---|---|
| | I | | II | | III | |
| | Lot 1 | Lot 2 | Lot 1 | Lot 2 | Lot 1 | Lot 2 |
| Benzyl alcohol | 2.69 | 2.63 | 1.07 | 3.63 | 3.47 | 2.46 |
| Original | 2.34 | 3.24 | 0.81 | 1.15 | 2.09 | 1.35 |

EXAMPLE 37

Similar tests were run with benzyl alcohol in comparison with benzethonium chloride, the monkey potency results being tabulated below:

*Monkey Potency Results of Vaccines Aged 6 Months—Ratio of Test Monkey Serum Titers to NIH Reference Antisera II A3*

| Preservative | Poliovirus Type | | | | | |
|---|---|---|---|---|---|---|
| | I | | II | | III | |
| | Lot 1 | Lot 2 | Lot 1 | Lot 2 | Lot 1 | Lot 2 |
| Benzyl alcohol | 1.51 | 0.76 | 2.71 | 4.11 | 4.41 | 2.05 |
| Benzethonium chloride | 0.57 | 1.07 | 1.79 | 2.05 | 4.41 | 1.56 |
| Initial potency | 2.00 | 0.83 | 3.83 | 2.90 | 9.45 | 1.35 |

EXAMPLE 38

In a manner similar to the above example, chick potency results were obtained with respect to vaccines aged 6 months, comparing benzyl alcohol (0.5% by volume) with benzethonium chloride (1:40,000 parts by weight):

*Chick Potency Results of Vaccines Aged 6 Months— Ratio of Test Vaccine to NIH 2A Reference Vaccine*

| Preservative | Poliovirus Type | | | | | |
|---|---|---|---|---|---|---|
| | I | | II | | III | |
| | Lot 1 | Lot 2 | Lot 1 | Lot 2 | Lot 1 | Lot 2 |
| Benzyl alcohol | 2.69 | 2.63 | 1.07 | 3.63 | 3.47 | 2.46 |
| Benzethonium chloride | 2.29 | 2.40 | 1.41 | 3.31 | 3.31 | 2.95 |
| Initial potency | 2.34 | 3.24 | 0.81 | 1.15 | 2.09 | 1.35 |

It will be noted from the above examples that the chick potency of the Type I virus in each case was greater with the benzyl alcohol preservative than with the benzethonium chloride preservative. Similar remarks are applicable generally to poliovirus Types II and III, although in one instance equal values were obtained and in two other instances, specifically the chick potency results with respect ot the Type II poliovirus of Lot 1 and to the Type III poliovirus of Lot 2, the benzethonium chloride appeared to produce a lesser adverse effect.

As will be apparent from the results of the foregoing tables, the vaccine products of the invention containing benzyl alcohol in a concentration of from 0.5% to 0.9% by volume retained their potency with respect to all three types of poliomyelitis virus on storage at 2–5° C. for 6 months, and at 37° C. for 7 days. The control samples retained their potency under the same conditions of storage but were susceptible to contamination from molds and fungi.

Although this invention has been described with reference to particular poliomyelitis antigens, it will be appreciated that it applies as well to specially treated products such as the purified poliomyelitis vaccine, for example, as disclosed in the co-pending application of Jesse Charney, Serial No. 839,543, filed September 10, 1959, which is assigned to the assignee hereof.

Having thus described our invention, we claim:

1. A poliomyelitis vaccine product comprising an aqueous solution containing at least one type of killed but antigenic poliomyelitis virus and benzyl alcohol in a concentration in the range from 0.5% to 0.9% by volume.

2. A vaccine product comprising an aqueous solution containing killed but antigenic poliomyelitis virus and at least one antigen selected from the group consisting of diptheria, tetanus and pertussis antigens and benzyl alcohol in the range of from 0.5% to 2.0% by volume.

3. A poliomyelitis vaccine product comprising an aqueous solution of killed but antigenic Types I, II and III of poliomyelitis virus and benzyl alcohol in a concentration in the range from 0.5% to 2.0% by volume.

4. A poliomyelitis vaccine product comprising an aqueous solution of killed but antigenic Types I, II and III of poliomyelitis virus containing less than 18 to 20 micrograms per milliliter of protein nitrogen and benzyl alcohol in a concentration in the range from 0.5% to 2.0% by volume.

5. A poliomyelitis vaccine product comprising an aqueous solution of killed but antigenic Types I, II and III of poliomyelitis virus containing less than 18 to 20 micrograms per milliliter of protein nitrogen and benzyl alcohol in a concentration of about 0.5% by volume.

6. A process for producing a poliomyelitis vaccine product which comprises adding sufficient benzyl alcohol to an aqueous solution containing at least one type of killed but antigenic poliomyelitis virus to produce a solution containing benzyl alcohol in a concentration in the range from 0.5% to 2.0% by volume.

7. Process of producing a poliomyelitis vaccine product which comprises adding sufficient benzyl alcohol to an aqueous solution of killed but antigenic Types I, II and III of poliomyelitis virus to produce a solution containing benzyl alcohol in a concentration in the range from 0.5% to 2.0% by volume.

8. A vaccine product comprising an aqueous solution containing combined poliomyelitis and tetanus antigens, said poliomyelitis antigen consisting essentially of at least one type of killed but antigenic poliomyelitis virus, and benzyl alcohol in a concentration of 0.5% to 2.0% by volume.

9. A vaccine product comprising an aqueous solution containing combined poliomyelitis-diphtheria-tetanus-pertussis antigens, said poliomyelitis antigen consisting essentially of at least one type of killed poliomyelitis virus, and benzyl alcohol in a concentratiaon of 0.5% to 2.0% by volume.

10. A vaccine product comprising an aqueous solution containing combined poliomyelitis, diphtheria and tetanus antigens, said poliomyelitis antigen consisting essentially of at least one type of killed poliomyelitis virus, and benzyl alcohol in a concentration of 0.5% to 2.0% by volume.

References Cited in the file of this patent

UNITED STATES PATENTS 2,793,160   McLean _____ May 21, 1957

FOREIGN PATENTS 885,966   France _____ Sept. 30, 1943

OTHER REFERENCES

Merck Index, 1952, pub. by Merck & Co. Inc., New Jersey, pages 131–132.

Gard: World Health Organization, Monograph Series No. 26, pages 225–235, 1955.

Kendrick: Amer. J. of Public Health, April 1957, pp. 473–483.